UNITED STATES PATENT OFFICE.

GADIENT ENGI, OF BASEL, SWITZERLAND, ASSIGNOR TO THE FIRM OF SOCIETY OF CHEMICAL INDUSTRY IN BASLE, OF BASEL, SWITZERLAND.

LEUCO COMPOUNDS OF VAT DYES AND PROCESS OF MAKING SAME.

No. 893,468.  Specification of Letters Patent.  Patented July 14, 1908.

Application filed January 9, 1907. Serial No. 351,445.

*To all whom it may concern:*

Be it known that I, GADIENT ENGI, chemist and doctor of philosophy, a citizen of the Swiss Republic, and a resident of Basel, Switzerland, have invented new and useful Leuco Compounds of Vat-Dyeing Dyestuffs and a Process for the Manufacture of the Same, of which the following is a full and clear specification.

In my United States Letters Patent No. 831841, dated September 25th, 1906, No. 836309, dated November 20th, 1906, No. 941003, dated January 8th, 1907, No. 848354, No. 848355, and No. 848356, dated March 27th, 1907, I have described a series of vat-dyeing dye-stuffs and their halogenated derivatives, which derive from the alicylthioacetic acid

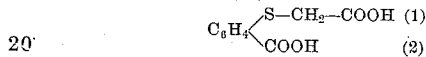 (1)
(2)

and can be obtained by heating the said salicylthioacetic acid alone or mixed with an isatin compound as for instance isatin and alphaisatinarylides, in presence of a convenient solvent or condensing agent, as nitrobenzene or acetic anhydrid and treating the resulting dyestuffs—when a transformation in halogenated derivatives is desired—with a halogen as for instance bromin. I have now found that these vat-dyeing dyestuffs belonging to the group of thioindigo, which contains all the atomic complex

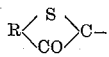

in combination with the rest of an alphaoxythionaphthene derivative or of an isatin compound and corresponding consequently to the general formula

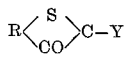

(wherein R stands for a radical aryl and Y for the rest of an alphaoxynaphthene derivative or of an isatin derivative) can be transformed into leuco derivatives which can be easily isolated in substance and process owing to their great stability or considerable industrial value particularly for printing purposes. The preparation of these leuco derivatives is effected by reducing the heretofore defined dyestuffs belonging to the thioindigo-group in an alcoholic suspension with an alkali hydrosulfid and by precipitating the so formed leuco-compound—after the alcohol has been distilled off—by means of diluted hydrochloric acid in form of colorless small crystals. By washing these latter and transforming the same into a paste, the new leuco-derivatives are obtained directly in a form suitable for their technical use.

The invention is illustrated by the following example: 2 parts of the dyestuff obtained by brominating the product resulting from the condensation of equimolecular proportions of salicylthioacetic acid and isatin and corresponding probably to the formula:

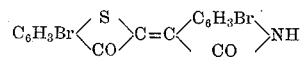

are boiled up with 40 parts of alcohol; then 4 to 5 parts of a potassium hydrosulfid (KHS) solution of 25 per cent. are added to the mass and this latter boiled for some time in a reflux apparatus, whereby a clear, bright-yellow solution is formed. After the greatest part of alcohol has been distilled off, the mass is diluted with water and acidulated with hydrochloric acid, whereby the leuco-derivative precipitates in the form of colorless crystals, which are separated by filtration, washed and transformed into a paste of the desired strength.

In an analogous manner the other dyestuffs belonging to the thioindigo-group, as for instance the thioindigo red,

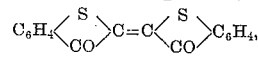

the products of condensation of salicylthioacetic acid with alphaisatin arylids

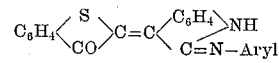

and their halogenated derivatives can be transformed into leuco-compounds.

In dry state the new leuco-compounds constitute colorless to yellowish-gray crystalline powders, insoluble in pure water, but soluble in alcohol and benzene with a light yellow to brownish-yellow color, soluble in dilute caustic alkalies with a brownish-yellow color. From the solutions of the leuco-compounds in dilute caustic alkalies the vat-dyeing dyestuffs from which they are derived, can be precipitated in form of flecks, by the action of the oxygen of the air or by adding oxidizing agents.

What I claim is:

1. The herein described process for the manufacture of leuco compounds of vat dyestuffs belonging to the group of thioindigo and corresponding to the general formula

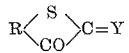

which process consists in treating the said dyestuffs in an alcoholic suspension with alkalihydrosulfids and isolating the formed leuco compounds by acidulating the mass of reaction.

2. As new products the herein described leuco compounds derived from vat dyestuffs of the thioindigo-group constituting in a dry state colorless to yellowish-gray crystalline powders, insoluble in pure water but soluble in alcohol and benzene with a light-yellow to brownish-yellow color, dissolving in dilute caustic alkalies with a brownish-yellow color from which solutions by the action of the oxygen of the air or by adding oxidizing agents the original vat-dyeing dyestuffs separates in the form of flecks.

In witness whereof I have hereunto signed my name this 19th day of December 1906, in the presence of two subscribing witnesses.

GADIENT ENGI.

Witnesses:
  GEO. GIFFORD,
  AMAND RITTER.